UNITED STATES PATENT OFFICE.

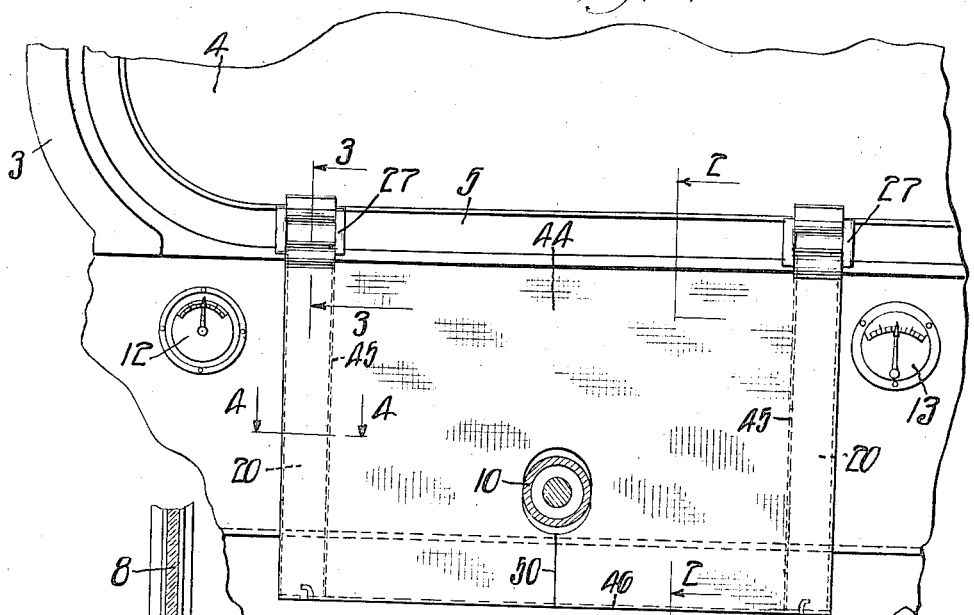
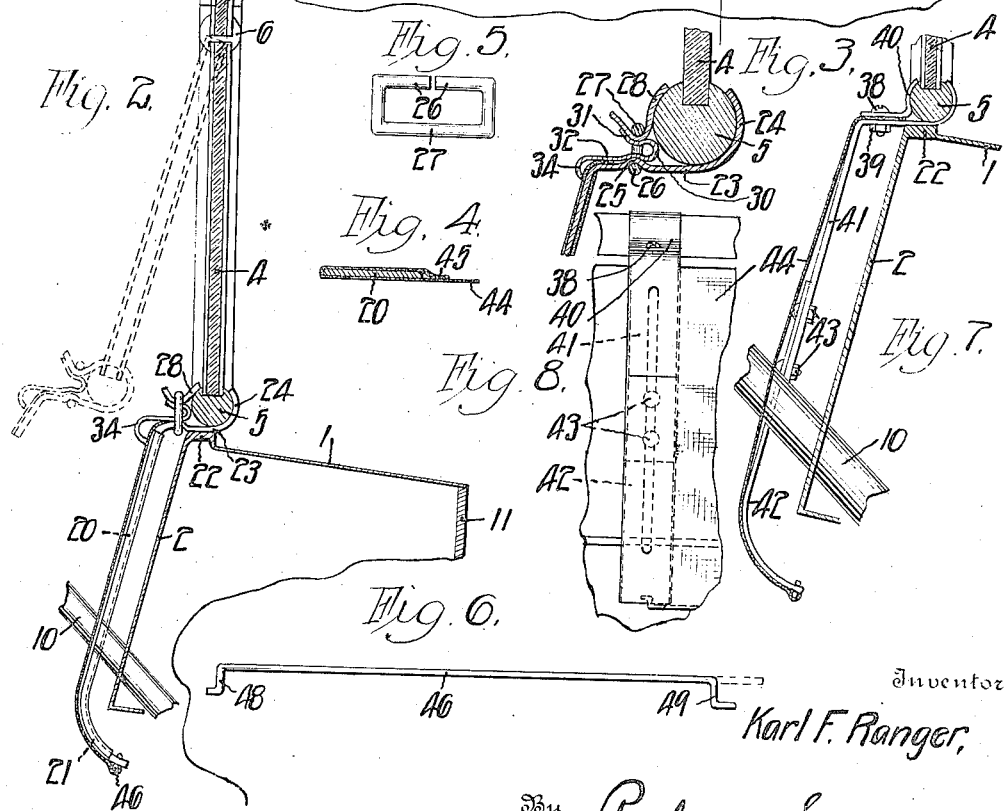

KARL F. RANGER, OF SYRACUSE, NEW YORK.

VENTILATOR.

1,277,477.

Specification of Letters Patent.

Patented Sept. 3, 1918.

Application filed March 21, 1917. Serial No. 156,259.

*To all whom it may concern:*

Be it known that I, KARL F. RANGER, a citizen of the United States, and residing at Syracuse, in the county of Onondaga and State of New York, have invented a new and Improved Ventilator, of which the following is a specification.

In the driving of motor vehicles of substantially all the types now constructed it is a well known fact that the feet of the driver and others sitting on the front seat are constantly overheated because of the close relation of the engine to the dash. Various efforts have been made to overcome this objection but the constructions devised for this purpose have in turn either been so expensive or involved such changes in the car as to commercially prevent their adoption in all but the higher priced vehicles, and they have in fact been embodied even in the latter only to a small extent. The primary object of the present invention is to provide a ventilating device which is capable of wide application in that it may be applied without material change to substantially all cars provided with the so-called ventilating type of wind-shield,—in other words, to those cars in which the lower section of the windshield may be swung rearwardly about pivots at or near its upper edge—and to provide such a device which, moreover may be manufactured at a very small cost.

To this end the invention consists in a ventilator or air deflector arranged to be secured upon the lower cross bar of the lower section of the windshield and to extend downwardly therefrom in such manner as to deflect the air downwardly and forwardly to a sufficient degree to insure a clearing out of the foot space and to prevent overheating thereof. In standard makes of cars the instrument board is located below the windshield and it is imperative that the visibility of the various instruments be not interfered with; the disposition of the several instruments laterally in respect to the steering post is variable, but there is substantially always a clear space of a foot or more between the instruments on the opposite sides of the post or elsewhere, which will accommodate a ventilator of the present type of width sufficient to keep the entire foot-space forward of the front seats at a proper temperature. The steering post substantially always passes through or is connected to the instrument board, and in the embodiment of the invention shown, the ventilator is made to embrace the steering post and extend below the latter. Another feature of the invention therefore consists in a ventilator which may be readily applied to the various makes of cars regardless of the relative relation of the steering post and the instruments on the instrument board. It will be understood, however, that the ventilator may and often will be positioned entirely at one side of the steering post. The invention also consists in a ventilator that may be both readily applied to the lower section of the windshield or detached therefrom; again it consists in a ventilator supported solely by the inwardly swingable lower section of a windshield. It further consists in the various details of construction shown, described and claimed.

In the drawings Figure 1 is a fragmentary elevation looking forwardly from the seat of the driver showing enough of the car to indicate the application of the invention. Fig. 2 is a section on the line 2—2 of Fig. 1. Figs. 3 and 4 are sections on the lines 3—3 and 4—4, respectively, of Fig. 1. Fig. 5 is an elevation of a loop member which forms a part of the clamp shown. Fig. 6 is an elevation of the wire whereby the lower edge of the fabric of the ventilator is retained taut. Fig. 7 is a view similar to Fig. 2 showing a modification and Fig. 8 is a fragmentary elevation corresponding to Fig. 7.

The preferred embodiment of the invention, as well as one position in which it may be applied to the car, is shown in Figs. 1 to 6 inclusive, and in these figures 1 indicates the cowl, 2 the instrument board (that in some cars is located appreciably forward of the rear edge of the cowl instead of substantially flush therewith), 3 the windshield supporting post, 4 the lower section of the windshield, and 5 the lower cross bar of the section. The details of these several elements may be varied within wide limits, but a point of importance in reference to this invention is that the lower windshield section is arranged to swing inwardly about pivots 6 located considerably above the lower cross bar. The upper section 8 of the windshield may be of any desired form, either swingable or fixed. The steering post, which appears conventionally at 10 and extends upwardly and rearwardly at an angle of about forty five degrees, is shown intersecting the instrument board in the usual manner. The dash appears at 11 (Fig. 2) but the floor is not shown. Instruments 12 and 13 of any desired nature are carried on the instrument board. It will be observed that these instruments are arranged on opposite sides of the steering post in the construction shown but they may be mounted entirely at one side.

Arranged to be clamped to the cross bar 5 at points spaced along the latter is a ventilator, the details of which will now be described. 20 indicates thin sheet metal strips, the body portions of which, when the windshield is in closed position, may extend substantially parallel to the face of the instrument board as indicated in full lines in Fig. 2. At its lower end each strip is preferably curved forwardly as shown at 21 (the length and curvature of the curved portion may be varied in installing the device so as to secure the best results in the particular car); and the upper end of the strips are preferably bent substantially horizontally from the body and pass through the narrow space between the lower edge of the cross bar 5 and the upper face of the cam 22 of the cowl as indicated at 23, and have their extreme forward ends bent upwardly at 24 to substantially conform to the front face of the cross bar of the particular shield. Just rearwardly of the cross bar the portions 23 may be deflected upwardly at 25 to form a depression in which the portions 26 of metal loops 27 may be received; these loops are shown of substantially rectangular form, but their construction may of course be varied, in fact the entire clamp is to be regarded as illustrative. Those portions of the loops opposite the portions 26 are arranged to embrace sheet metal clamping members 28 of substantially U-shape in vertical cross section and of widths corresponding practically to that of the strips 20. Interposed between the members 28 and the forwardly turned portions of the corresponding strips 20 are springs which are preferably formed of flat sheet metal stock and which may include beads 30 of greater cross sectional dimension than the distance between the lower face of the member 28 and the upper face of the strip 20 at the deflection point 25. As shown, the upper arms 31 of the springs conform closely to the lower faces of the rear end of the members 28, and the lower arms 32 of the springs extend back along the upper faces of the portions 23 and preferably have their rear ends turned downwardly as indicated at 34 to press tightly against the bodies of the members 20. The clamp described lends itself readily to production by commercial processes, and affords an inexpensive and reliable means for retaining the strips 20 in place, and one that effectually prevents rattling. In the modification of the clamp which appears in Figs. 7 and 8 the forwardly extending portion 36 of the strip is perforated to receive a screw 38 that engages a nut 39 (which may be soldered to the lower face of the strips) whereby the second member 40 of the clamp is so held as to firmly and resiliently press against the inner face of the cross bar. This construction is also very cheap and well suited to its purpose. A slight modification of the strip itself—namely, the formation of the latter in two slotted sections 41—42 connected by screw bolts 43 to allow for adjustment as to length also appears in Figs. 7 and 8.

The two strips constitute a support for a fabric covering 44 such, for example, as thin water proof material, the side edges of which are preferably brought down around the forward faces of the strips and sewed to the body of the fabric at 45. Any suitable means may be employed for spreading the lower ends of the strips apart sufficiently to prevent the fabric from sagging. As shown, the lower edge of the latter is beaded to form a channel to receive a wire 46 the ends of which may be bent as indicated at 48 and 49, the former before and the latter after being passed through holes punched in the corresponding strips.

In those instances in which the ventilator is to be applied so as to extend on opposite sides of the steering post, the fabric is cut at 50, enough of the material being removed around the post to allow the necessary movement of the wind shield section to and from closed position. The wire 46 is of course inserted after the cut is made. If desired, the fabric may be cut close enough to the post to exert appreciable pressure on the sides of the latter (which tends to prevent vibration) without interfering with the movement of the windshield. In some instances, the bead may be formed along the upper edge of the fabric and the slash 50 be on the side of the post opposite to that shown, which involves the use of a second wire 46 (not shown) at the top.

The fabric is finally drawn upwardly and in the embodiments shown, is slipped under the springs 34—32 or the members 40, as the case may be, whereby it is held taut. Other fastening means may obviously be used.

In use the device in no way interferes with the swinging of the windshield, and when the latter has been swung inwardly more or less, as indicated in dashed lines in Fig. 2, the air is directed downwardly and forwardly and spreads out laterally to keep the entire foot space at the proper temperature.

The details of the construction are subject to wide variation. It is also recognized that the ventilator may in some cases be formed as a permanent part of the lower swinging section. I do not, therefore, wish to be limited except as indicated by the subjoined claims.

I claim:—

1. In combination with a motor vehicle body having an instrument board and a wind shield including a section pivoted to swing inwardly about a horizontal axis above its lower edge from closed to open position, an air deflector attached to and swingable with said section and depending below the upper edge of the instrument board on the rear side thereof and spaced from the board to form a downwardly opening channel, whereby a current of air is directed downwardly into the foot space of the vehicle when the wind shield section is in open position.

2. In combination with a motor vehicle body having a wind shield including a section pivoted to swing inwardly about a horizontal axis above its lower edge from closed to open position, an air deflector attached to and swingable with said section and depending below the lower edge of said section and constructed and arranged to form a downward extension thereof, whereby a current of air is directed downwardly into the foot space of the vehicle when the wind shield section is in open position.

3. In a motor vehicle, a wind shield section supported to swing inwardly about a substantially horizontal axis located considerably above the lower edge of said section, in combination with an air deflector detachably secured to the lower edge of the section and arranged to form a downward extension thereof.

4. In a motor vehicle, a wind shield section supported to swing inwardly about a substantially horizontal axis located considerably above the lower edge of said section, in combination with an air deflector supported by the lower edge portion of said section and arranged to form a downward extension thereof to direct an air current into the foot space of the vehicle when the section is in open position.

5. In a motor vehicle, a wind shield section supported to swing inwardly about a substantially horizontal axis located considerably above the lower edge of said section, in combination with an air deflector attached to the lower edge portion of said section and extending downwardly therefrom, the lower edge portion of the deflector being turned forwardly to direct an air current downwardly and forwardly into the foot space of the vehicle.

6. In combination with a motor vehicle body having an instrument board and a wind shield section swingable inwardly about a horizontal axis above the lower edge of said section, an air deflector attached to the lower edge of the section and swingable therewith, said deflector being so constructed and arranged as to extend substantially directly rearwardly from said edge for a short distance and then downwardly back of the instrument board to form with said board a channel through which a current of air is directed downwardly into the foot space when the wind shield section is in open position.

7. A motor vehicle comprising a wind shield section mounted to swing inwardly about pivots above its lower edge, an air deflector forming a detachable downward extension of the section, said deflector including clamping means gripping the lower edge of the section, said clamping means including a pair of jaw elements, means for retaining the jaw elements together, and a compression spring having a loop adjacent the section and a neck portion coöperating with the retaining means rearwardly of the neck portion for holding the spring in position.

8. An air deflector for motor vehicles including a framework and a flexible covering therefor, said covering being slit inwardly from one edge to allow it to be passed around the steering post of the vehicle, and said framework including a compression element constructed and arranged to be positioned after the covering has been passed around the steering post to hold the slitted edge of the covering taut.

9. In combination with a motor vehicle body having a wind shield section pivoted to swing inwardly about a horizontal axis above its lower edge, an air deflector supported by the section and constructed and arranged to direct an air current into the foot space of the vehicle when the section is swung inwardly, said deflector intersecting the steering post of the vehicle and being slotted to allow swinging movement of the deflector about the axis of the wind shield section.

10. In combination with a wind shield section of a motor vehicle and the steering post thereof, said section being pivoted to swing about an axis located above its lower edge, a downwardly extending air deflector attached to the lower edge of the section and constructed and arranged to direct air downwardly into the foot space of the vehicle, said deflector including means cooperating with the steering post tending to prevent flapping of the deflector.

11. In combination with a wind shield section of a motor vehicle, said section being pivoted to swing about an axis located above its lower edge, a downwardly extending air deflector attached to the lower edge of the section and constructed and arranged to direct air downwardly into the foot space of the vehicle, and means coöperating with the deflector at a point below the lower edge of the section tending to prevent flapping of said deflector.

KARL F. RANGER.